G. W. KNAPP.
HINGE FOR LIDS OF TEAPOTS AND OTHER VESSELS.
APPLICATION FILED MAR. 24, 1908.
921,614.
Patented May 11, 1909.
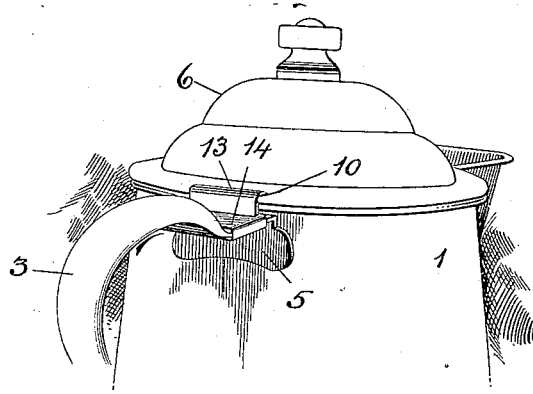
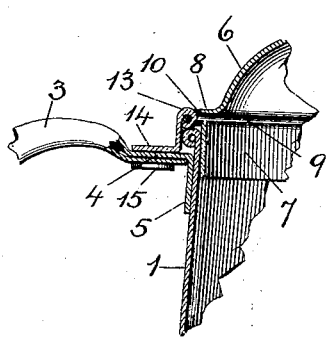 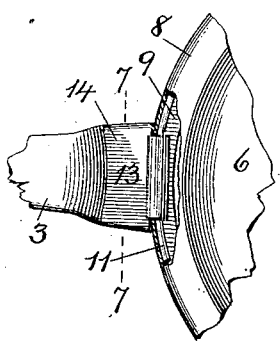 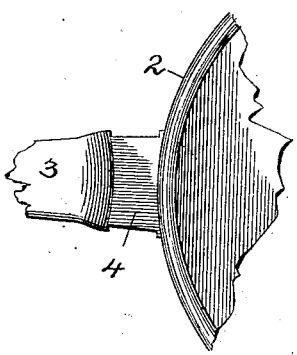
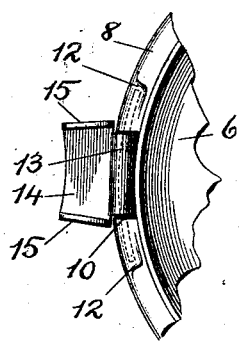  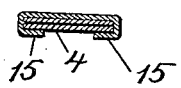
Witnesses
G. Ferdinand Vogt.
Martin B. Parker.
Inventor
George W. Knapp
By Mann & Co.
Attorneys.

UNITED STATES PATENT OFFICE.

GEORGE W. KNAPP, OF BALTIMORE, MARYLAND, ASSIGNOR TO NATIONAL ENAMELING AND STAMPING COMPANY, A CORPORATION OF NEW JERSEY.

HINGE FOR LIDS OF TEAPOTS AND OTHER VESSELS.

No. 921,614.      Specification of Letters Patent.      Patented May 11, 1909.

Application filed March 24, 1908. Serial No. 422,928.

*To all whom it may concern:*

Be it known that I, GEORGE W. KNAPP, a citizen of the United States, residing at Baltimore, in the State of Maryland, have invented certain new and useful Improvements in Hinges for Lids of Teapots and other Vessels, of which the following is a specification.

This invention relates to an improved construction of one-piece sheet-metal hinge for uniting the lid or cover of a teapot to the handle thereof without the use of solder or rivets.

The improvement will first be described and the features of invention will then be pointed out in the claim.

In the drawings which illustrate the improved construction—Figure 1 is a perspective view showing the upper part of a pot, the handle, the lid, and the hinge-clip securing the lid to the handle. Fig. 2 is a vertical sectional view showing a portion of a tea-pot with upper end of handle attached thereto, a portion of the lid, and the hinge parts. Fig. 3 is a top view of the same parts shown in Fig. 2 and also showing a portion of the lid-rim broken away to expose the wire-pintle inclosed in said rim. Fig. 4 is a top view of the upper rim of a tea-pot and a portion of the handle attached thereto. In this figure neither the lid nor hinge appears. Fig. 5 is a view of a portion of the lid inverted and the hinge clip jointed on the lid. Fig. 6 is a cross-section on the line 7—7 of Fig. 3 showing the handle and hinge-clip before the tangs on the clip have been bent. Fig. 7 is a cross-section on the line 7—7 of Fig. 3 showing the handle and hinge-clip after the tangs are bent.

The parts that are comprised in the improvement are a lid or cover having a double-thick rim provided with a notch or cut-away; a wire-pintle inclosed in the said double-thick rim and extending across the notch; and a one-piece sheet-metal hinge and clip combined and jointed on said wire-pintle and clipped to the handle, all as will now be particularly described.

The body of the vessel, 1, may have its upper rim-edge, 2, beaded or turned over, with or without inclosing a stiffening wire; a handle, 3, has its upper end suitably attached to the body near its rim-edge. It is immaterial as to what the details are for effecting this attachment of the handle. In the present instance the upper end of the handle has two thicknesses of sheet-metal as shown in Fig. 2, forming a shank 4, which is in proximity to the upper rim-edge of the pot and the uppermost thickness of this part of the handle is bent downward at a right-angle, as at, 5, and is secured by any suitable means, such as solder or rivets, to the body of the vessel. The only part of a handle that is essential for this improved hinge is a horizontal shank part, such as, 4, adjacent the body.

The lid or cover, 6, has a down-flange, 7, which enters the top of the body of the teapot, as shown in Fig. 2; this down-flange, 7, and the dome part of the lid are integral being connected by a rim, 8. The rim, 8, of the lid sits on the upper edge 2 of the body of the vessel or pot. The said rim, 8, of the lid is formed by a double thickness of the metal, which double-thickness produces on the inside, and immediately over the said down-flange, 7, an annular groove, 9, extending entirely around the lid. Where the hinge is located, both thicknesses of the said rim is notched or cut away, as at, 10, see Figs. 1, 2 and 5, and a wire-pintle, 11, is in the said groove, 9, and extends across the cut-away, 10. This pintle is held tightly to its position in the groove simply by compressing the two thicknesses of the metal forming the groove, as indicated at, 12, in Fig. 5.

The wire-pintle, 11, constitutes one part of the hinge, and turns with the lid when the latter is raised or lowered; the other part, 13, of the hinge consists of one-piece of sheet-metal and is stationary and is clipped to the shank, 4, of the handle. This hinge-clip has an eye or sleeve, 13, through which the wire-pintle extends and also has a flange, 14, provided at each of two opposite sides with a tang, 15. In Figs. 5 and 6 the two tangs are shown unbent, that is at right-angles with respect to the flange, 14, and in Figs. 2 and 7, the tangs are bent under the shank, 4, of the handle, and thereby the tangs serve to "clip" and hold the eye or sleeve, 13, stationary to the handle. The tangs, 15, may be set tightly by a suitable tool so as to pinch the shank part, 4, of the handle. The one-piece sheet-metal hinge comprises an eye, 13, a flat flange, 14, and two tangs, 15, of which one is at each of two opposite sides of said flange.

It will be understood that while the invention has been described as applied to such vessels as tea pots, it is applicable to other vessels having handles and lids or covers.

Having thus described my invention what I claim and desire to secure by Letters Patent is:—

The improved construction for hinging lids to tea-pot handles, comprising a lid having an integral down-flange, 7, which is connected with the lid by a surrounding double-thick rim, 8, which holds a pintle, 11; a handle attached to the tea-pot; and a one-piece sheet-metal hinge consisting of an eye, 13, coupled with the pintle, a flange seated on top of the handle and provided with two integral tangs extending from the said flange and taking under the handle.

In testimony whereof I affix my signature in presence of two witnesses.

GEORGE W. KNAPP.

Witnesses:
GEO. W. KNAPP, Jr.,
LOUIS C. KLERLEIN.